United States Patent
Shibuya et al.

[11] Patent Number: 5,841,527
[45] Date of Patent: Nov. 24, 1998

[54] LASER REFERENCE LEVEL SETTING DEVICE

[75] Inventors: Hiroto Shibuya; Toshikazu Adegawa, both of Tokyo, Japan

[73] Assignee: Kabushiki Kaisha TOPCON, Tokyo-to, Japan

[21] Appl. No.: 765,567

[22] PCT Filed: May 20, 1996

[86] PCT No.: PCT/JP96/01325

§ 371 Date: Jan. 13, 1997

§ 102(e) Date: Jan. 13, 1997

[87] PCT Pub. No.: WO96/37755

PCT Pub. Date: Nov. 28, 1996

[30] Foreign Application Priority Data

May 25, 1995 [JP] Japan ..................................... 7-150893
Jul. 11, 1995 [JP] Japan ..................................... 7-198190
Feb. 29, 1996 [JP] Japan ..................................... 8-069364

[51] Int. Cl.$^6$ .............................. G01B 11/26; G01C 1/00
[52] U.S. Cl. .................................. 356/139.1; 356/139.06; 356/139.08
[58] Field of Search .............................. 356/139.1, 141.1, 356/141.3, 139.06, 139.08

[56] References Cited

U.S. PATENT DOCUMENTS

| | | |
|---|---|---|
| 3,894,805 | 7/1975 | Middleton ............................... 356/138 |
| 3,907,435 | 9/1975 | Roodvoets . | |
| 4,053,238 | 10/1977 | George et al. . |
| 4,457,621 | 7/1984 | Harris et al. . |
| 4,717,251 | 1/1988 | Wells et al. . |
| 5,098,185 | 3/1992 | Watanabe . |
| 5,621,531 | 4/1997 | Van Adel ................................ 356/399 |

FOREIGN PATENT DOCUMENTS

| | | |
|---|---|---|
| 0 631 110 | 12/1994 | European Pat. Off. . |
| 3-23314 | 3/1991 | Japan . |
| 5-79426 | 10/1993 | Japan . |
| 7-35550 | 2/1995 | Japan . |
| 7-83656 | 3/1995 | Japan . |
| 7-91927 | 4/1995 | Japan . |
| 8-5376 | 1/1996 | Japan . |

*Primary Examiner*—Stephen C. Buczinski
*Attorney, Agent, or Firm*—Nields, Lemack & Dingman

[57] ABSTRACT

The present invention provides a laser reference level setting device, by which it is possible to adjust irradiating positions of a laser beam in vertical and horizontal directions with a simple arrangement and without additional manpower and to measure a tilt angle. The device comprises a laser sighting device and a target, the target having a reflection surface for indicating a given position on the target, and the laser sighting device comprising a laser oscillating device having an emitting means rotatably supported and for emitting a laser beam and a light receiving means for receiving a reflection laser beam, a driving unit for rotating at least the laser beam emitting means of the laser oscillating device, and a control unit for controlling the driving unit to direct the laser beam to a given position on the target according to the light receiving condition of the reflected laser beam reflected from the reflection surface of the target.

6 Claims, 13 Drawing Sheets

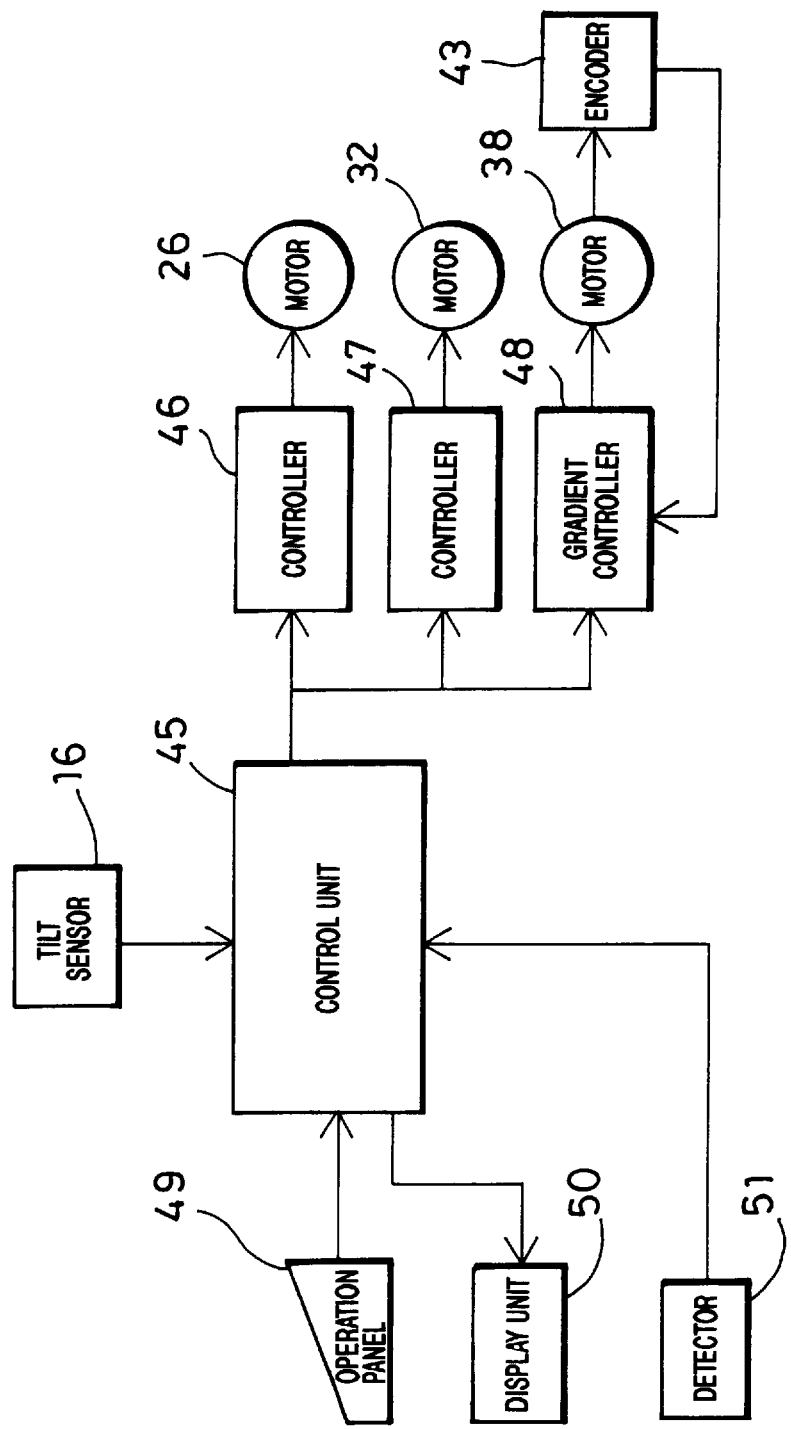

LASER REFERENCE LEVEL SETTING DEVICE

FIELD OF THE INVENTION

The present invention relates to a laser reference level setting device for setting a reference level, which serves as a reference for position, posture, etc. of concrete pipes when the concrete pipes are laid and buried underground, and in particular to a laser reference setting device, by which a target used for the laser reference level setting device and the center of the target are detected, and a laser beam is irradiated to the center of the target.

BACKGROUND ART

Typical operation in case concrete pipes are laid and buried underground is to dig the ground and to lay concrete pipes one after another into a ditch and to bury them.

For each linear section, the ground is dug down to the depth where concrete pipes are to be buried, and the concrete pipes are laid on a temporary base installed at the bottom of the ditch. In this case, adjustment is made in such manner that a direction and an inclination of the concrete pipes, in particular the lowermost position of inner side of each of the concrete pipes, are consistent with each other. Then, the concrete pipes are reburied.

These concrete pipes are used as passages for city water, sewage water or for passing other liquid and are laid with a certain inclination and without bending. If the buried concrete pipes are twisted and turned upward, downward, leftward or rightward, the liquid may stagnate or stop or leak into the soil, and the function as the passage cannot be fulfilled. Accordingly, an adequate reference line is required when the concrete pipes are to be laid.

A laser beam is suitable as such a reference line. The laser beam has no problem of slackening as in the case of threads even when used for a long distance, or the laser beam causes no hindrance to working. It is not cut of f due to interference with operators or concrete pipes.

To form a reference line by a laser beam for the purpose of laying concrete pipes, a laser reference level setting device is used.

The laser reference level setting device comprises a laser sighting device and a target. The laser sighting device is placed at a first manhole or at starting point of a ditch, and the target is positioned at the other end of the ditch. The target has a marking at the center to indicate the center position, and the target is placed in such manner that the center position of the target coincides with the center position of the concrete pipe to be laid. The center position of the target is determined by a measuring instrument such as a theodolite, etc.

Next, A laser beam is emitted from the laser sighting device, and the laser sighting device is adjusted so that the laser beam is irradiated toward the center of the target. When the adjustment is completed, the laser beam emitted from the laser sighting device serves as the reference line for laying the concrete pipes.

However, a vibration occurs during construction such as a vibration caused by construction work or by vehicles passing by, and a displacement often occurs due to the vibration. Therefore, re-adjustment must be made when the construction is stopped and so positions of the laser sighting device and the target must be adjusted rather frequently.

Then, the laser reference level setting device and the target are proposed to detect the center of the target.

The laser reference level setting device comprises a laser sighting device and a target. Further, the laser sighting device comprises a laser oscillating device rotatably supported and having an emitting means for emitting a polarized laser beam and a light receiving means for receiving a laser beam reflected from the target, a driving unit for rotating the laser oscillating device in upward, downward, leftward or rightward directions and a control unit for driving the driving unit depending upon a light receiving condition of the laser beam reflected from the target. A reflection surface of the target is designed as a retroreflection surface having a reflection layer comprising small spheres or small prisms. On its left or right half, a $\frac{1}{4} \lambda$ birefringence member is attached.

When the target is scanned with a polarized laser beam coming from the laser sighting device to traverse and scan it in a horizontal direction and the laser beam is irradiated on the target, a polarized light beam is reflected, which is different from the polarized light beam irradiated from the reflection surface where the $\frac{1}{4} \lambda$ birefringence member is attached. On the other reflection surface, the light beam is reflected with the initial polarized light unchanged. The laser oscillating device can detect the center of the target by detecting the condition of the reflection light from the target, i.e. by detecting a point where the polarization condition changes. The control unit controls the driving unit and directs the laser beam toward the center of the target, and an irradiating position in a horizontal direction is determined. To determine the irradiating position in a vertical direction, the system is usually operated manually or by a radio control while watching the target and is adjusted toward the center.

After concrete pipes have been laid and buried, it should be confirmed that the concrete pipes have been laid as the predetermined setting and that there is no change over time in the buried condition of the concrete pipes when a certain time elapsed after burying. This is performed by measuring tilting of flow passage or tunnel. Description is now given on a conventional mode of measurement of tilting of a tunnel referring to FIG. 22.

In a tunnel 1, a concrete pipe 2 is laid, and manholes 3 and 4 are dug on an upstream end and a downstream end of the tunnel 1. At a predetermined position on the upstream end of the concrete pipe 2, e.g. at the lowermost position of the concrete pipe, a leveling instrument 5 is arranged and adjusted at a horizontal position and a staff 6 is erected at a vertical position based on the adjusted horizontal position of the leveling instrument 5. At a position on the downstream end of the concrete pipe 2 and matching the horizontally adjusted position, i.e. at the lowermost position, of the leveling instrument 5, a leveling instrument 7 is installed and adjusted at a horizontal position, and a staff 8 is erected in a vertical position based on the leveling instrument 7. A leveling instrument 9 is installed on the ground surface, and numeral values relating to the staffs 6 and 8 are read by the leveling instrument 9. From the difference between these values and from the distance between the staffs 6 and 8, a gradient of the tunnel 1 is determined.

To determine the irradiating position of the laser beam in a conventional type laser reference level setting device and the target, a $\frac{1}{4} \lambda$ birefringence member is attached on one-half of the reflection surface of the target, and the center of the target is detected according to the light receiving condition of the laser beam reflected from the target. Then, the position is automatically adjusted in such manner that the laser beam is irradiated toward the center. Therefore, on the reflection surface where the $\frac{1}{4} \lambda$ birefringence member is attached, a polarized laser beam is reflected, which has a polarizing condition different from that of the irradiated laser beam. On the other hand, the other reflection surface is an ordinary reflection surface where the irradiated laser beam is reflected while maintaining the initial polarizing condition. Accordingly, if a reflection surface which consists of metal, etc. is present at a position closer to the target plate, the reflection light maintaining the polarizing condition is reflected. As a result, the center of the target cannot be detected.

In many systems or instruments, positioning is carried out automatically in a horizontal direction but manually in a vertical direction. In case the buried pipe is extensively deviated, the laser beam is kept away from the target, and it is difficult to adjust. For this reason, operators must be assigned on both sides, i.e. on the laser reference level setting device side and the target side, and two or more operators are needed for positioning. This means lower working efficiency and much waste of time. If a mechanism to rotate by 90° is installed on the target for automating the positioning operation in a vertical direction to save manpower, the system itself becomes more complicated, thus resulting in higher manufacturing cost.

In the conventional measurement of tilting of tunnel as described above, operators must enter the manholes 3 and 4 to install the leveling instruments 5 and 7 and to erect the staffs 6 and 8 in a vertical direction. For this purpose, additional operators must be assigned, and it is also difficult to perform accurate measurement.

To solve the above problems, it is an object of the present invention to provide a device, by which it is possible to detect the center of a target in reliable manner with simple arrangement, to adjust irradiating position of laser beam in vertical and horizontal directions with simple arrangement and without additional manpower, to assign only one operator for the purpose to save labor and to eliminate waste of time, to measure tilt angle of a tunnel after completion or of a tunnel already existing by only one operator, and to increase the measuring accuracy.

DISCLOSURE OF THE INVENTION

The laser reference level setting device of the present invention comprises a laser sighting device and a target, the target having a reflection surface for indicating a given position on the target, and the laser sighting device comprising a laser oscillating device having an emitting means rotatably supported and for emitting a laser beam and a light receiving means for receiving a reflection laser beam, a driving unit for rotating at least the laser beam emitting means of the laser oscillating device, and a control unit for controlling the driving unit to direct the laser beam to a given position on the target according to the light receiving condition of the reflected laser beam reflected from the reflection surface of the target, whereby the laser beam is irradiated from the laser oscillating device, the laser beam is irradiated to scan the target by traversing it, the reflected light from the reflection surface is detected by the light receiving means, the reflected light thus detected is recognized as the light from the target according to the light receiving condition at the light receiving means, the light receiving conditions are calculated, and the driving unit is controlled according to the results of calculation and the irradiating direction of the laser beam is determined, and after determining the irradiating direction of the laser beam, a tilt angle of the irradiating direction with respect to a horizontal direction can be measured by setting the irradiating direction toward a horizontal direction.

In so doing, it is possible to reliably recognize the reflected light from the target, to accurately detect the center of the target, and to align the irradiating position of the laser beam with the center of the target without erroneous operation, to align the irradiating position in vertical and horizontal directions with the center of the target without rotating the target. As a result, no additional operators are needed, waste of time can be eliminated, and working efficiency can be improved.

Further, the device according to the present invention comprises a tilt angle detecting means for detecting upward and downward rotating angles of the laser oscillating device, a tilt sensor for detecting a horizontal position, and a display unit for displaying a tilt angle of the laser beam irradiated from the laser oscillating device based on the detection of the tilt angle detecting means and the tilt sensor, whereby a tilt angle of laser reference can be easily set, or the device of the present invention comprises a horizontal angle detecting means for detecting a horizontal rotating angle of the laser oscillating device and a display unit for displaying a horizontal angle of the laser beam irradiated from the laser oscillating device based on the detection of the horizontal angle detecting means, or it comprises a liquid crystal shutter at least on one of the reflection surfaces of the target, and the light receiving means of the laser sighting device comprises an electric filter synchronous with opening/closing frequency of the liquid crystal shutter, or the light receiving means has a means for splitting the reflection light and has a filter synchronous with opening/closing frequency of the liquid crystal shutter, the light receiving condition of the reflection light thus split and received is detected through the filter, and the center of the target is detected by comparing light quantity, or noise when receiving a reflection light from the target can be eliminated by varying opening/closing frequency of the liquid crystal shutter. Or, the device according to the present invention is characterized in that the reflection surface of the target is placed at a position separated by a given distance from the center of the target, or the target has reflection surfaces at symmetrical positions in vertical and horizontal directions, or the target has a plurality of reflection surfaces forming a given pattern along at least one scanning direction, or at least one of the reflection surfaces of the target has a width with its shape gradually changing, or the control unit calculates the position of the weighted center of the light receiving signal and the center of the target is obtained from the position of the weighted center, or the control unit calculates a pulse width of the light receiving signal and the center of the target is obtained from the pulse width and the center of the target is obtained from an aspect of the reflection light from the target, or the control unit calculates a scan rotating angle of the laser beam based on the pulse width of the light receiving signal, and the distance between the laser oscillating device and the target is calculated from the dimension of the target corresponding to the scan rotating angle and the pulse width.

BRIEF DESCRIPTION OF THE DRAWINGS

FIG. 4 is a control block diagram of the above embodiment.

FIG. 10 (B) is a diagram showing a detection signal of the reflected laser beam.

THE BEST MODE FOR CARRYING OUT THE INVENTION

In the following, detailed description will be given on the present invention referring to the attached drawings.

Figure 6:
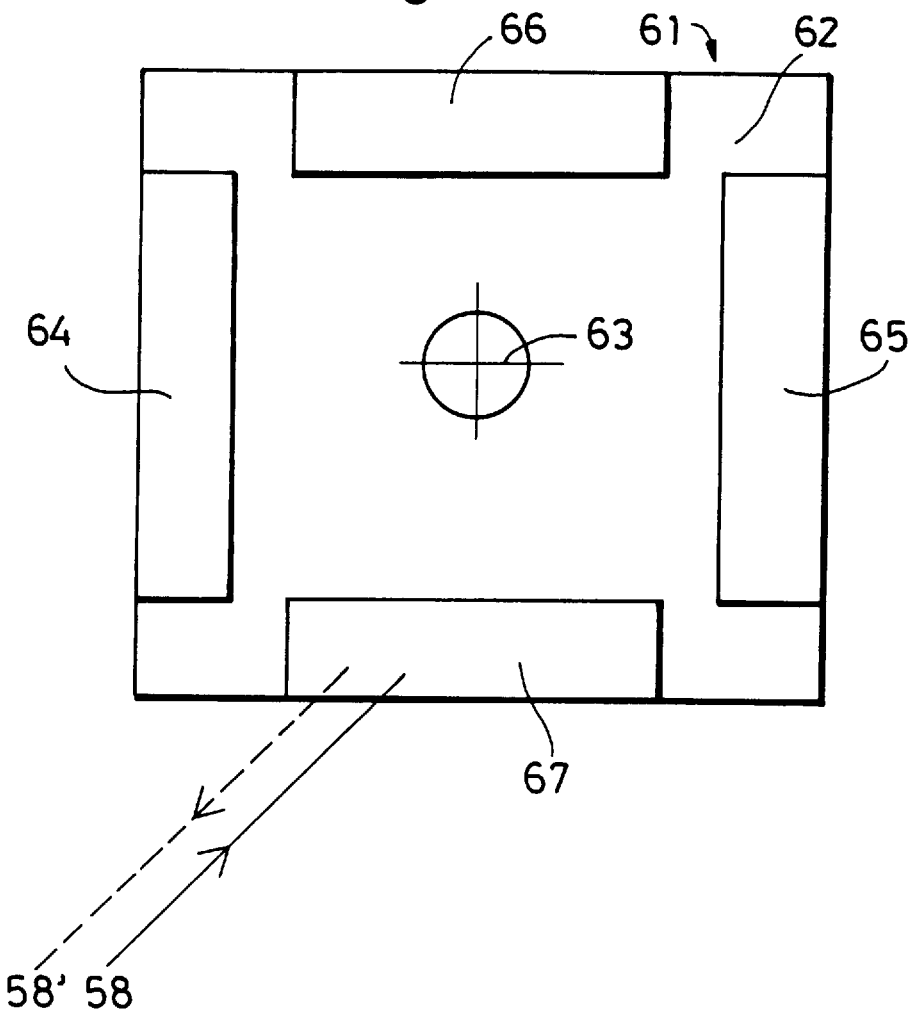
FIG. 6 is a front view of a target used in the above embodiment.

FIG. 1 to FIG. 4 each represents a laser sighting device 10, and FIG. 6 represents a target 61.

First, the laser sighting device 10 will be described.

A laser oscillating device 11 is provided on a swing frame 13, which is tiltable around a horizontal shaft 12. The swing frame 13 is mounted on a main unit frame (not shown) around a vertical shaft 14 so that it can be rotated in a horizontal direction. A tilting disk 42 is arranged on the horizontal shaft 12, and a tilt lever 15 is connected to the tilting disk 42. A tilt sensor 16 such as bubble tube to indicate a horizontal condition is arranged on the tilting disk 42. An encoder 43 is provided on the horizontal shaft 12 to detect a rotating angle of the horizontal shaft 12, namely a tilt angle of the laser oscillating device 11. A signal from the encoder 43 is inputted to a gradient controller 48 (to be described later).

A horizontal angle adjusting mechanism 17 is connected to the swing frame 13, and a vertical angle adjusting mechanism 18 is connected to the laser oscillating device 11. A tilt sensor tilting mechanism 19 is connected to the tilt lever 15. The tilt sensor tilting mechanism 19 is mounted on a support member of the laser oscillating device 11 and is tilted integrally with the laser oscillating device 11.

The horizontal angle adjusting mechanism 17 comprises a first screw 20 rotatably arranged in a horizontal direction, a first slide nut 21 engaged with the first screw 20, a pin 23 studded into the first slide nut 21 and engaged with the swing frame 13, a driven gear 24 engaged with the first screw 20, and a horizontal angle adjusting motor 26 connected to the driven gear 24 via a driving gear 25.

The vertical angle adjusting mechanism 18 comprises a second screw 27 rotatably arranged in a horizontal direction, a second slide nut 28 engaged with the second screw 27, a pin 29 studded in the second slide nut 28 and engaged with the laser oscillating device 11, a driven gear 30 engaged with the second screw 27, and a vertical angle adjusting motor 32 connected with the driven gear 30 via a driving gear 31.

The tilt sensor tilting mechanism 19 comprises a third screw 33 rotatably arranged in a vertical direction, a third slide nut 34 engaged with the third screw 33, a pin 35 studded in the third slide nut 34 and engaged with the tilt lever 15, a driven gear 36 engaged with the third screw 33, and a gradient setting motor 38 connected to the driven gear 36 via a driving gear 37.

A horizontal adjustment controller 46 controls and drives the horizontal angle adjusting motor 26, and a vertical angle controller 47 controls and drives the vertical angle adjusting motor32. A gradient controller 48 controls and drives the gradient setting motor 38.

The horizontal angle adjusting motor 26 of the horizontal angle adjusting mechanism 17 is driven by the horizontal adjustment controller 46. The vertical angle adjusting motor 32 of the vertical angle adjusting mechanism 18 is driven by the vertical angle controller 47. The gradient setting motor 38 of the tilt sensor tilting mechanism 19 is driven by the gradient controller 48. A rotating angle signal from the encoder 43 is inputted to the gradient controller 48.

The horizontal adjustment controller 46, the vertical angle controller 47 and the gradient controller 48 are controlled by a control unit 45, and a detection signal from the tilt sensor 16 is inputted to the control unit 45. An operation panel 49 for starting and stopping the system or for setting the gradient, a display unit 50 for displaying a gradient setting value, operating conditions, an irradiating direction of a laser beam and detecting position of the target 61, and a first reflection laser beam detector 51 (to be described later) are connected to the control unit 45.

Next, brief description will be given on the laser oscillating device 11 referring to FIG. 5.

In the figure, reference numeral 55 represents a laser beam emitter, which comprises a light emitting diode 56 and a collimator lens 57. The laser beam emitted from the light emitting diode 56 is turned to a parallel laser beam 58 by the collimator lens 57, which are irradiated to the target 61 through a first half-mirror 59 or a perforated mirror.

A reflected light 58' reflected by the target 61 enters the laser oscillating device 11, and the reflected light 58' thus entered is received by a light receiving means, which comprises a focusing lens 60, the first reflection laser beam detector 51, etc. When the first reflection laser beam detector 51 receives the reflection light 58' via the focusing lens 60, the first reflection laser beam detector 51 inputs a detection signal to the control unit 45. The control unit 45 drives and controls the horizontal angle adjusting motor 26 via the horizontal adjustment controller 46 depending upon the light receiving condition of the first reflection laser beam detector 51 and also drives and controls the vertical angle adjusting motor 32 via the vertical angle controller 47, thereby determining an irradiating direction of the laser beams 58 coming from the laser oscillating device 11. In FIG. 5, the laser emitter and the optical system of the laser oscillating device which emits a laser beam are integrated with the reflection laser beam detector and the optical system, serving as the light receiving unit for receiving the reflection laser beam, while these may be arranged as separate units.

Next, description will be given on the target 61 referring to FIG. 6.

A cross 63 is marked at the center of the target on a target plate 62 in a rectangular shape (the center of the target agrees with the center of the figure in this case), and a left reflection surface 64, a right reflection surface 65, an upper reflection surface 66 and a lower reflection surface 67 are arranged around the point of intersection of the cross 63 at symmetrical positions in horizontal and vertical directions. The left reflection surface 64 and the right reflection surface 65 have the same width at least in a horizontal direction. The upper reflection surface 66 and the lower reflection surface 67 have the same width at least in a vertical direction. In case the above widths are not identical with each other, the left reflection surface 64 and the right reflection surface 65 or the upper reflection surface 66 and the lower reflection surface 67 may be at symmetrical positions with respect to a vertical line or a horizontal line of the cross.

In each of the left reflection surface 64, the right reflection surface 65, the upper reflection surface 66 and the lower reflection surface 67, a retro-reflection layer comprising small spheres or small prisms is attached on the target plate 62.

In the following, description will be given on the setting of a reference line in case where a reference line is tilted at a given angle of θ with respect to a horizontal line when concrete pipes or the like are buried underground.

The laser sighting device 1 is installed, and by a rod-shaped bubble tube (not shown) mounted on the top surface of the laser sighting device 1, it is adjusted in such manner that it is placed at a horizontal position with respect to peripheral direction of the pipe (i.e. a direction perpendicular to an axial direction of the pipe).

Next, a preset tilt angle θ is inputted to the control unit 45 by the operation panel 49. The control unit 45 drives the gradient setting motor 38 via the gradient controller 48. The third slide nut 34 is moved upward via the driving gear 37, the driven gear 36 and the third screw 33, and the tilt lever 15 is tilted in a direction opposite to the preset tilt angle θ. The tilt lever 15 is integrally rotated with the tilting disk 42, and a rotating angle of the tilting disk 42 is detected by the encoder 43 and is fed back to the gradient controller 48. When the detection angle of the encoder 43 is equalized with the preset angle, the gradient setting motor 38 is stopped.

The control unit 45 drives the vertical angle adjusting motor 32 via the vertical angle controller 47, moves the second slide nut 28 via the driving gear 31, the driven gear 30 and the second screw 27, and integrally tilts the laser oscillating device 11 and the tilt lever 15 via the pin 29. The vertical angle adjusting motor 32 is driven until the angle detected by the tilt sensor 16 is turned to 0.

When the control unit 45 detects a reference level sent from the tilt sensor 16, the vertical angle adjusting motor 32 is stopped, and the laser beam emitted from the laser oscillating device 11 is set to the preset angle θ. This preset angle is displayed on the display unit 50.

After the tilt angle has been set, the horizontal angle adjusting motor 26 is driven, and the laser beam emitted from the laser oscillating device 11 is irradiated for scanning by the horizontal angle adjusting mechanism 17. The horizontal direction of the reference line is set in such manner that the laser beam is irradiated toward the point of intersection of the cross 63 according to the detection of the target 61.

In case the laser sighting device is installed again after gradient setting has been completed for once by the laser sighting device, it is not always necessary to set the laser oscillating device again. Because the angle already set can be obtained by the encoder even when the main unit is installed at any angle, the difference from the newly set angle can be obtained by calculation, and it is turned to the newly set angle when the tilt sensor reaches the reference level.

It is needless to say that a motor such as a pulse motor, a DC motor, a servomotor, etc. can be used as the gradient setting motor 38. Further, it will suffice if the encoder 43 is mechanically connected with the tilting disk 42, and it may be connected to the horizontal shaft 12 via a shaft coupling or via a motion transmitting means such as a gear, etc. Because the encoder 43 detects an actual tilt angle, the gradient may be displayed on a gradient setting display unit mounted at a given position on the laser sighting device. The position of the tilt sensor 16 is not limited to the tilting disk 42, and it may be at the position on the tilt lever 15, etc. where it can be tilted integrally with the tilt lever 15. Further, the encoder 43 may be of optical type or of magnetic type.

Next, the device according to the present invention has a function to detect the center of the target 61. Because of this function to detect the center, it is possible to automatically adjust when the irradiating position of the laser beam is shifted due to vibration or other causes.

First, the laser sighting device 10 is installed at the starting site in a horizontal direction, and the target 61 is placed at the target position. The laser sighting device 10 is operated and the laser beam 58 is irradiated, and the irradiating directions are manually set toward left or right or tilted. After the setting, automatic adjustment is performed.

The horizontal angle adjusting motor 26 is rotated, and the first screw 20 is turned. Via the first slide nut 21 and the pin 23, the laser oscillating device 11 of the laser sighting device 10 is reciprocally rotated in a horizontal direction around the vertical shaft 14, and the parallel laser beams 58 are irradiated for reciprocally scanning in a horizontal direction. When scanning in a horizontal direction, reciprocal scanning is performed while the beams are moved upward or downward. If the target is not detected, the range of scanning is widened, and scanning is performed further.

Figure 7:
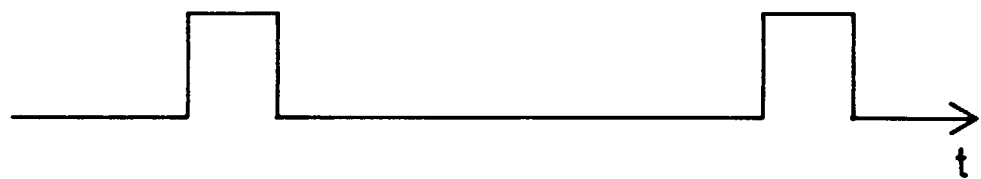
FIG. 7 shows a waveform of a light receiving signal obtained by irradiating a laser beam to the target.

When the laser beams 58 traverse the target 61, the reflection light 58' from the left reflection surface 64 and the right reflection surface 65 enters the laser oscillating device 11, and the reflection light 58' is detected by the first reflection laser beam detector 51. As shown in FIG. 7, the light receiving signal from the first reflection laser beam detector 51 is in pulse form having the same width separated by a given spacing and the same shape . If the signal coming from the first reflection laser beam detector 51 is in form of pulse having the same width at a given spacing, the control unit 45 recognizes that the received reflection light is from the target 61, and the weighted center in a horizontal direction with respect to the two light receiving signals, i.e. the point of intersection of the cross 63 in a horizontal direction, is calculated. The calculation result is stored in the control unit 45 and is displayed as a horizontal angle on the display unit 50. The display of the horizontal angle is effective for measurement of tilt angle and bending of the concrete pipe, etc. Further, based on the calculation result, the control unit 45 controls the horizontal adjustment controller 46 and drives the horizontal angle adjusting motor 26. The irradiating direction of the laser beam 58 is aligned with the calculated direction and with the position of the weighted center in a horizontal direction.

In case the position of the horizontal weighted center is calculated, the angular difference of the irradiating direction of the laser beam between the left reflection surface 64 and the right reflection surface 65 is obtained. Because the distance between the left reflection surface 64 and the right reflection surface 65 is already known, the distance from the laser sighting device 10 to the target 61 can be measured by the angular difference and from the distance between the left reflection surface 64 and the right reflection surface 65.

When the irradiating position in a horizontal direction has been set, the vertical angle adjusting motor 32 is driven to turn the second screw 27, and the laser oscillating device 11 is tilted at a given angle in a vertical direction around the horizontal shaft 12 via the second slide nut 28, the pin 29 and the spring frame 13, and the scanning in a vertical direction is started.

Based on the condition of the light receiving signal from the first reflection laser beam detector 51, the control unit 45 calculates the position of the weighted center in a vertical direction, i.e. the point of intersection of the cross 63 in a vertical direction. The calculation result is displayed as a vertical angle on the display unit 50, and based on the calculation result, the control unit 45 controls the vertical angle controller 47 and drives the vertical angle adjusting motor 32 and aligns the irradiating direction of the laser beam 58 with the position of the weighted center in a vertical direction. The laser beam 58 is set in horizontal and vertical directions, and the irradiating point of the parallel laser beams 58 agrees with the point of intersection of the cross 63. The operation in horizontal and vertical directions may be set, and other operations may be manually performed.

Next, by providing the reflection surface with a liquid crystal shutter, the noise in the light receiving condition of the reflection light 58' can be decreased, and the center of the target can be detected in reliable manner.

Figure 8:
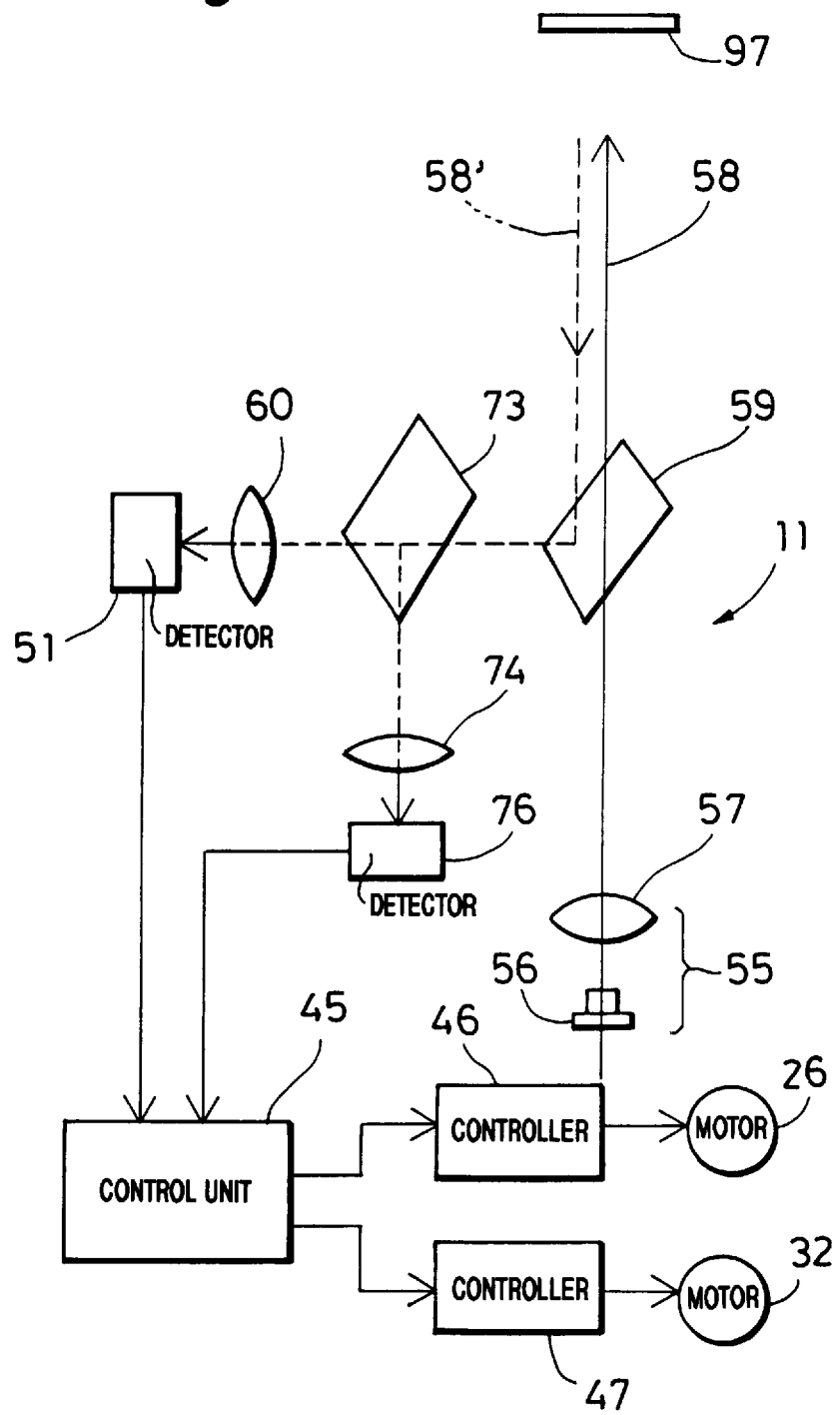
FIG. 8 is a block diagram showing another optical system of the laser oscillating device of the laser sighting device of the present invention.
Figure 9:
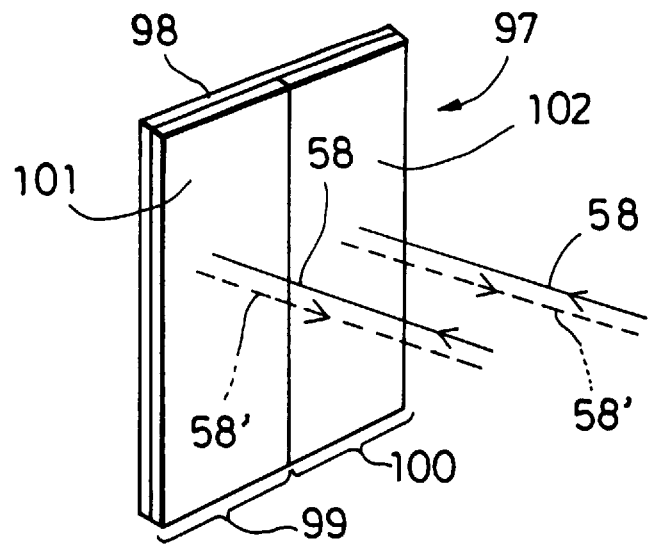
FIG. 9 is a drawing for explaining a target used for the optical system.
Figure 10A:
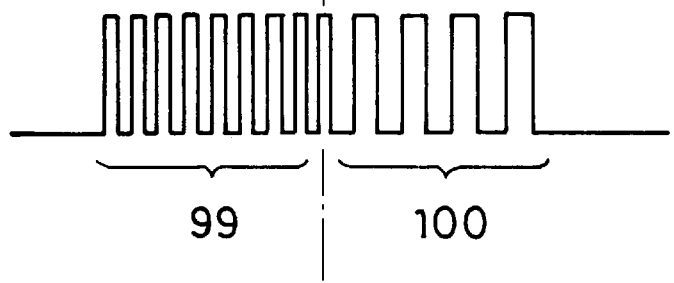
FIG. 10 (A) represents a waveform of laser beam reflected from the target.
Figure 10B:
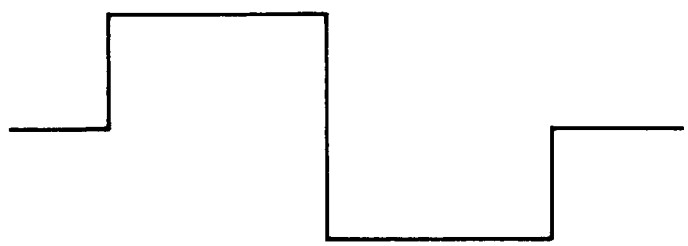

Description is now given on an embodiment having a liquid crystal shutter on the reflection surface referring to FIGS. 8 to 10.

FIG. 8 shows a laser oscillating device 11, which matches a target 97 provided with a liquid crystal shutter.

The laser beam coming from the light emitting diode 56 is turned to parallel laser beams 58 by the collimator lens 57 and the beams are irradiated toward the target 97 through a first half-mirror 59 or a perforated mirror.

The reflection light 58' reflected by the target 97 enters the laser oscillating device 11, and the reflection light 58' thus entered is reflected by the first half-mirror 59. Further, a part of the reflection light 58, passes through a second half-mirror 73 and is received by a first light receiving means, which comprises a focusing lens 60, a first reflection laser beam detector 51, etc. When the first reflection laser beam detector 51 receives the reflection light 58' via the focusing lens 60, the first reflection laser beam detector 51 inputs a detection signal to the control unit 45. The remaining part of the reflection light 58' is reflected by the second half-mirror 73 and is received by a second light receiving means, which comprises a focusing lens 74, a second reflection laserbeam detector 76, etc. When the second reflection laser beam detector 76 receives the reflection light 58' via the focusing lens 74, the second reflection laser beam detector 76 inputs a detection signal to the control unit 45.

Each of the first reflection laser beam detector 51 and the second reflection laser beam detector 76 is provided with an electric filter, which is synchronous with frequency of the liquid crystal shutter to be described later.

The control unit 45 compares light receiving quantity of the first reflection laser beam detector 51 and the second reflection laser beam detector 76 and detects and calculates the light receiving condition and controls a driving unit depending upon the light receiving condition thus obtained. As a result, the irradiating direction of the laser beams 58 from the laser oscillating device 11 is determined. The driving unit comprises a horizontal angle adjusting motor 26, a vertical angle adjusting motor 32, a motion transmitting means such as a first screw 20, a second screw 27, etc. and a horizontal adjustment controller 46, a vertical angle controller 47, etc. for driving the horizontal angle adjusting motor 26 and the vertical angle adjusting motor 32.

Next, description will be given on the target 97 referring to FIG. 9.

The surface of a target plate 98 is designed as a retro-reflection surface comprising small spheres or small prisms, etc. On the reflection surface of the target plate 98, there are provided two liquid crystal shutters 101 and 102, which divide the reflection surface into a left reflection surface 99 and a right reflection surface 100. A control means (not shown) for opening and closing the liquid crystal shutters 101 and 102 at different frequencies is provided at a given position, e.g. on the rear side, of the target 97. It is designed in such manner that the boundary line between the liquid crystal shutters 101 and 102 runs through the center of the target 97.

First, the laser sighting device is installed in a horizontal direction at the starting point, and the target 97 is placed at the target position. The laser sighting device is operated and the laser beams 58 are irradiated. The irradiating direction is adjusted to left or to right or tilted manually to set it approximately. After the setting, automatic adjustment is performed.

The vertical angle adjusting motor 32 is rotated to turn the second screw 27, and the laser oscillating device 11 of the laser sighting device is reciprocally rotated in a horizontal direction around the vertical shaft 14 via the second slide nut 28 and the pin 29, and the laser beams 58 are irradiated in a horizontal direction for reciprocal scanning.

When the laser beams 58 traverse the target 97, the beams are reflected by the left reflection surface 99 and the right reflection surface 100. When the liquid crystal shutters 101 and 102 are driven, the reflection light 58' on the left and the right reflection surfaces 99 and 100 is shut off in response to opening and closing of the liquid crystal shutters 101 and 102, and the light beams are modulated to the reflection light beams having the same frequencies as opening/closing frequencies of the liquid crystal shutters respectively. As a result, the reflection light 58' is as shown in FIG. 10 (A).

The reflection light 58' enters the laser oscillating device 11 and is split by the second half-mirror 73, and the reflection light 58' is detected by the first reflection laser beam detector 51 and the second reflection laser beam detector 76. The first reflection laser beam detector 51 and the second reflection laser beam detector 76 have electric filters for transmitting the electronical signal with frequencies synchronous with opening/closing frequencies of the liquid crystal shutters as described above. The first reflection laser beam detector 51 receives only the reflection light 58' from the left reflection surface 99 and its output is inputted to the control unit 45. The second reflection laser beam detector 76 receives only the reflection light 58' from the right reflection surface 100, and its output is inputted to the control unit 45. When the deviation between the two detectors 51 and 76 is taken up on the control unit 45, the output is as shown in FIG. 10 (B), and the center of the target can be detected at the point where the output changes from positive into negative. The control unit 45 controls the vertical angle controller 47, drives the vertical angle adjusting motor 32 and aligns the irradiating direction of the laser beam 58 to the center of the target 97 (i.e. the boundary between the left reflection surface 99 and the right reflection surface 100).

Further, through the electric filters as described above, the first reflection laser beam detector 51 and the second reflection laser beam detector 76 receive only the reflection light from the target 97. As a result, the noise from other unnecessary reflectors can be eliminated, and the detection accuracy is increased.

Next, in the embodiments explained in connection with FIGS. 5 to 7, it is possible to attach the liquid crystal shutters on the left reflection surface 64, the right reflection surface 65, the upper reflection surface 66 and the lower reflection surface 67 of the target 61. It is also possible to provide a shutter control circuit for driving each of the liquid crystal shutters at different frequencies at a given position, e.g. on the rear side, of the target 61. In this case, an electric filter synchronous with frequency of the liquid crystal shutters is provided on the first reflection laser beam detector 51. Or, the reflection laser beam detection circuit may have the same arrangement as the one shown in FIG. 8 described later.

When the liquid crystal shutters are driven, the reflection light is shut off according to opening or closing of the liquid crystal shutters and is modulated at the driving frequency of the liquid crystal shutters. Further, through the electric filter as described above, the first reflection laser beam detector 51 can detects only the reflection light from the target 61. Thus, the noise from other unnecessary reflector can be eliminated, and the detection accuracy is improved. The liquid crystal shutters provided on the left reflection surface 64, the right reflection surface 65, the upper reflection surface 66, and the lower reflection surface 67 may be opened or closed at the same frequency or at different frequencies. In case the liquid crystal shutters are opened or closed at different frequencies, each of the left reflection surface 64, the right reflection surface 65, the upper reflection surface 66 and the lower reflection surface 67 can be separately identified if electric filters having the frequencies corresponding to the liquid crystal shutters are arranged on the detector.

On the reflection surface of the target 61, the left reflection surface 64, the right reflection surface 65, the upper reflection surface 66 and the lower reflection surface 67 may be continuous to each other, or the width of the reflection surfaces may be varied in horizontal or vertical directions. Further, a plurality of reflection surfaces may be provided along the scanning line in such manner that a given pattern is formed, that the pattern is recognized based on the light receiving signal obtained by scanning, that the light receiving signal is recognized as the one coming from the target, and that the center of the target can be identified based on the pattern. Further, if a ¼ λ birefringence member is mounted on the surface of the liquid crystal shutter and a polarization beam splitter is provided instead of the second half-mirror, the phase of the reflection laser beam reflected by the reflection surface of the target is shifted by 90° with respect to the irradiated laser beam, and the polarization beam splitter allows only the beam to pass, which has the phase shifted by 90°. As a result, light beams reflected by unnecessary reflection surface are cut off, and the reflection light can be more easily distinguished. Further, the ¼ λ birefringence member may be provided on the rear side of the liquid crystal shutter. Or, a polarizing plate may be arranged instead of the beam splitter at a position closer to the target than the second half-mirror.

Figure 11:
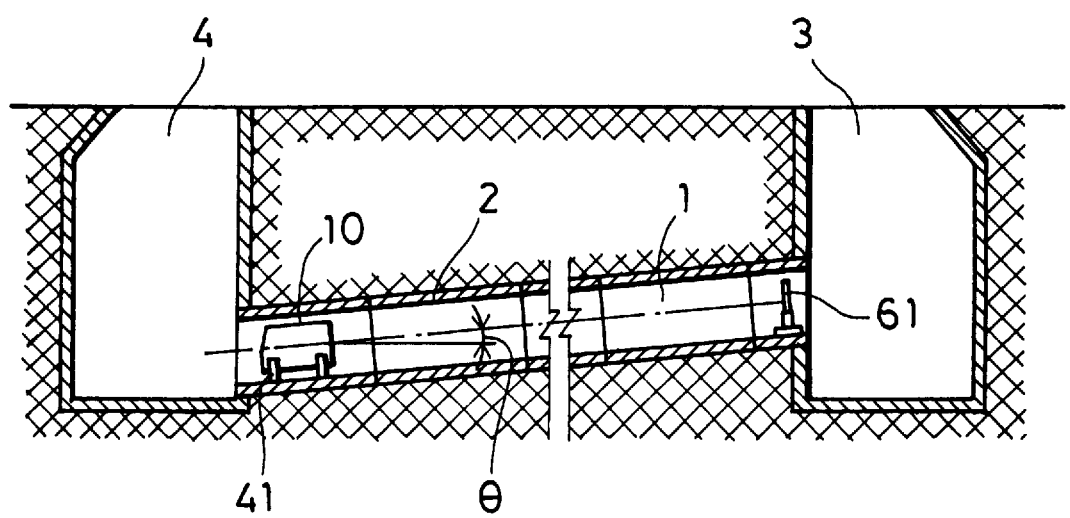
FIG. 11 is a drawing for explaining a case where a tilt angle of a tunnel is measured by the laser reference level setting device of the present invention.
Figure 12:
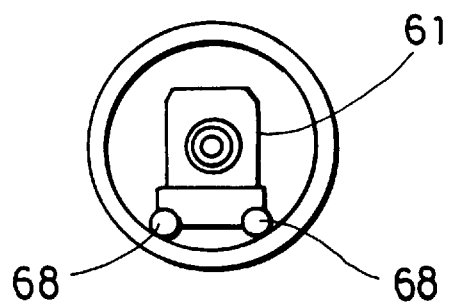
FIG. 12 shows relationship between a target used for measuring the tilt angle and the tunnel 1.

Next, description will be given on the measurement of a tilt angle of a tunnel 1 by the laser sighting device 10 according to the present invention referring to FIGS. 11 and 12.

The target 61 is installed at one end of the tunnel 1, and the laser sighting device 10 is arranged on the other end. The target 61 has such structure that the irradiated center (the point of intersection of the cross 63) agrees with the center of a concrete pipe 2 when the concrete pipe 2 is laid.

Similarly, the laser sighting device 10 is arranged on the concrete pipe 2 via a support leg 41, and the emitting center of the laser beam of the laser sighting device 10 approximately agrees with the center of the concrete pipe 2.

When the laser sighting device 10 is operated, the laser sighting device 10 automatically detects the irradiated center of the target 61 by the operation as already described, and the irradiating position of the laser beam is aligned with the irradiated center of the target 61. In this case, the irradiating direction of the laser beam and the tilt angle of the tilt sensor are aligned with the inclination of the tunnel 1.

Next, in order that the tilt sensor is turned to a horizontal direction, the gradient setting motor 38 is driven via the gradient controller 48, and the result of the detection by the tilt sensor 16 is turned to at a horizontal position. An angle between the case where the laser beam is irradiated toward the irradiated center of the target 61 and the case where the detection result of the tilt sensor 16 indicates a horizontal position is detected by the encoder 43. The result thus detected is the tilt angle of the tunnel 1, and the tilt angle is displayed on the display unit 50. The horizontal angle is also displayed on the display unit 50 as described above. Thus, the tilt angle and the horizontal angle can be measured, and the results of the measurement can be easily seen on the display unit 50. As the measuring operation, it will suffice only to install the laser sighting device 10 and the target 61 in the tunnel 1, and a single operator can carry out the job. Further, the distance can also be measured as described above.

Figure 13:
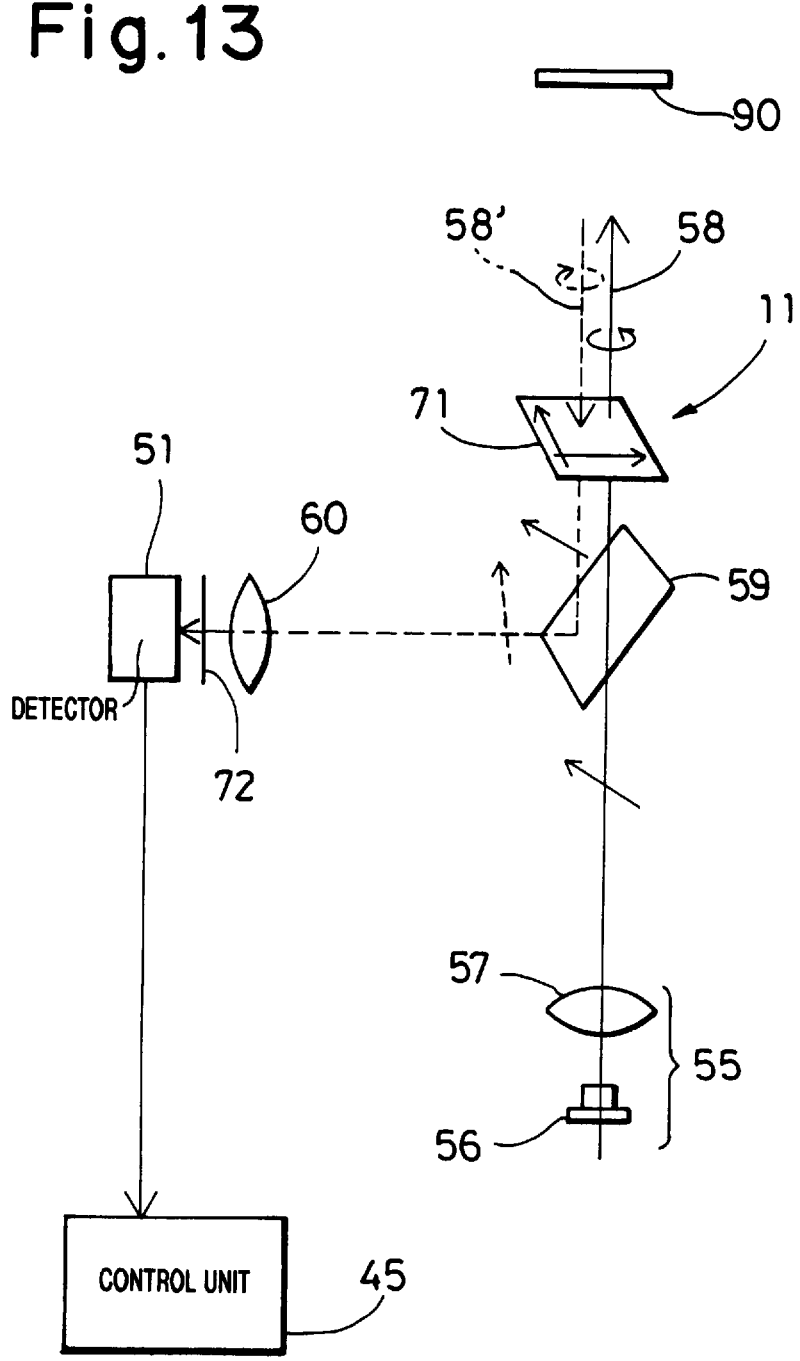
FIG. 13 is a block diagram showing another example of the optical system of the laser oscillating device to be provided in the laser reference level setting device of the present invention.

In an embodiment shown in FIG. 13, the laser beam irradiated from the lasersighting device10 is turned to a circularly polarized light in order that the detection accuracy of the reflection light 58' by the first reflection laser beam detector 51 can be improved and that the amount of information obtained by the detection of the reflection light 58' can be increased. The laser beam passing through the first half-mirror 59 is further passed through a ¼ λ birefringence member 71 to turn it to a circularly polarized laser beam, and it is emitted from the laser sighting device 10.

Figure 15:
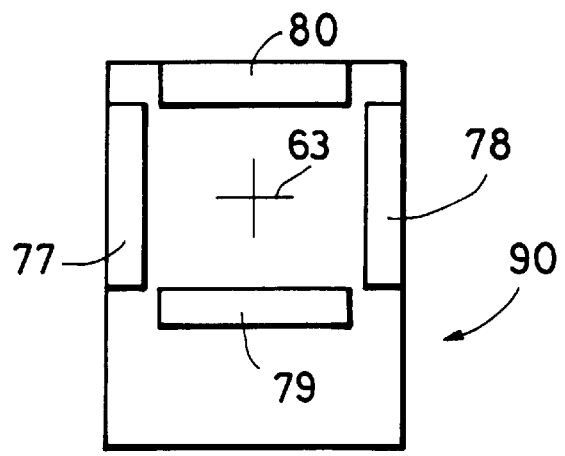
FIG. 15 shows another example of the target.

FIG. 15 shows a target 90 used in the present embodiment.

The target 90 is different from the target 61 in that a ¼ λ birefringence member is provided on each of the left reflection surface 64, the right reflection surface 65, the upper reflection surface 66, and the lower reflection surface 67 to make them polarized reflection surfaces 77, 78, 79 and 80.

A circularly polarized laser beam 58 irradiated from the laser sighting device 10 is reflected by the polarized reflection surfaces 77, 78, 79 and 80 of the target 90 and is turned to a circularly polarized laser beam 58', which has a direction of polarization different from that of the irradiated circularly polarized laser beam 58. When the circularly polarized laser beam 58' passes through the ¼ λ birefringence member 71, it is turned to a linearly polarized laser beam, which has a direction of polarization deviated by 90° from that of the linearly polarized laser beam irradiated from the laser beam emitter 55. The circularly polarized laser beam 58' passes through a polarizing plate 72 and is received by the first reflection laser beam detector 51. The direction of polarization of the polarizing plate 72 is aligned in advance with the direction of polarization of the beam, which is reflected by the reflection surface of the target 90 and enters after passing through the ¼ λ birefringence member 71.

The first reflection laser beam detector 51 receives only the light beam, which is irradiated from the laser sighting device 10 and is reflected by the polarized reflection surfaces 77, 78, 79 and 80. When disturbing light beams such as sunlight reflected by an unnecessary reflector enters, the light beams are cut off, and the detection accuracy is improved. The procedure to find out the irradiated position on the target 90 is the same as explained for the target 61. That is, the laser beam is irradiated to scan in a horizontal direction and the position of the weighted center in a horizontal direction by reflection light is obtained. Then, a vertical scanning is performed to obtain the position of the weighted center in a vertical direction by the reflection light.

Next, examples of other types of target are described referring to FIGS. 16 to 19.

Figure 16:
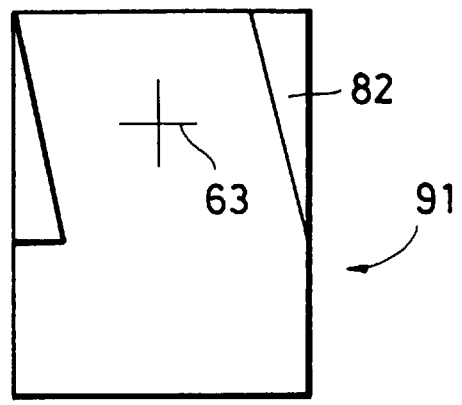
FIG. 16 shows still another example of the target.

The target 19 shown in FIG. 16 has reflection surfaces 81 and 82 in form of an erect right-angled triangle and an inverted right-angled triangle arranged at symmetrical positions respectively.

A circularly polarized laser beam 58' coming from the target 91 is turned to two pulse-like laser beams, and pulse widths at left and right vary according to the position where the laser beam is irradiated for scanning. A position where left and right pulse widths are equal to each other is the position where the laser beam passes through the point of intersection of the cross 63. By calculating the ratio (weighted center) of the left and the right pulse widths, it is possible to detect the position in a horizontal direction of the cross 63. Therefore, the laser beam is scanned in a horizontal direction and the scanning position is moved in a vertical direction against the target 91, it is possible to align the center of irradiation with the point of intersection of the cross 63. Therefore, there is no need to stop the horizontal movement and to scan in a vertical direction for obtaining the position of the center in a vertical direction as in the cases of the targets 61 or 90 as shown in FIGS. 6 or 15, and the working efficiency is improved.

Figure 17:
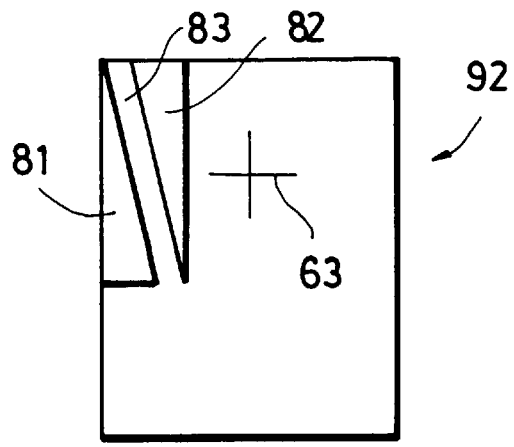
FIG. 17 shows yet still another example of the target.

The target 92 shown in FIG. 17 is also the same as the target 91. Reflection surfaces 81 and 82 are arranged at one corner of the target plate 92 in form of an erect right-angled triangle and an inverted right-angled triangle with a strip-like non-reflection surface 83 therebetween along the diagonal line. Because the distances from the reflection surfaces 81 and 82 or the non-reflection surface 83 to the cross 63 are already known, the position of the point of intersection of the cross 63 can be obtained by finding the center of each of the reflection surfaces 81 and 82 and the non-reflection surface 83.

Figure 18:
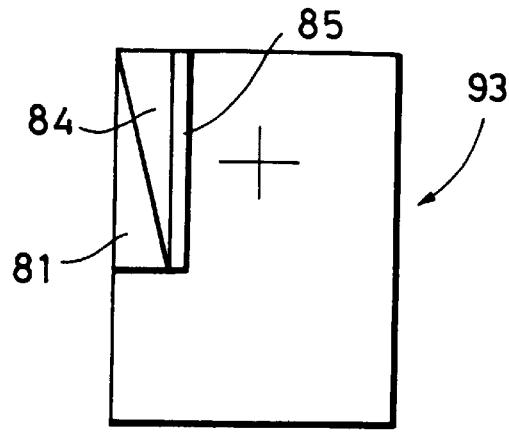
FIG. 18 shows a further example of the target.

In the target 93 shown in FIG. 18, a reflection surface 81 in form of an erect right-angled triangle and a non-reflection surface 84 in form of an inverted right-angled triangle are arranged adjacent to each other, and a strip-like reflection surface 85 is provided along the non-reflection surface 84. When the laser beam is irradiated for horizontally scanning the reflection surface 81, the non-reflection surface 84 and the reflection surface 85, a pulse-like reflection light beam is reflected from the reflection surfaces 81 and 85 of the target 93. By detecting the condition where a pulse width of the reflection light from the reflection surface 81 is equalized with a width from the above pulse to the pulse of the reflection light reflected by the reflection surface 85 (width of the non-reflection surface 84), it is possible to detect the irradiated center of the target 93 in the same manner as already described.

Figure 19:
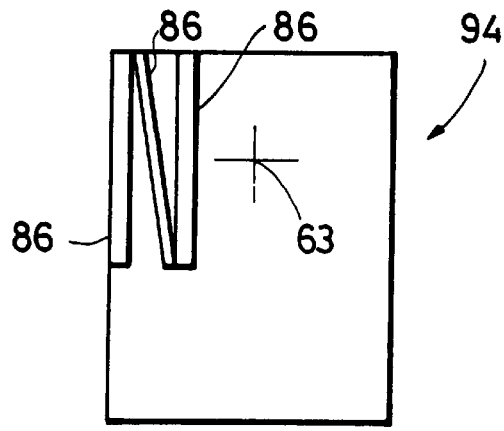
FIG. 19 shows still another example of the target.

In the target 94 shown in FIG. 19, three strip-like reflection surfaces 86 are arranged in form of a letter "N". When a laser beam is irradiated for horizontally scanning against the target 94, three pulse-like reflection light beams having the same width are reflected from the target 94. The position where the spacings of the three pulse-like reflection beams are identical with each other is the position where the laser beam passes through the point of intersection of the cross 63. As already described, the irradiated center of the target 94 can be detected.

Figure 1:
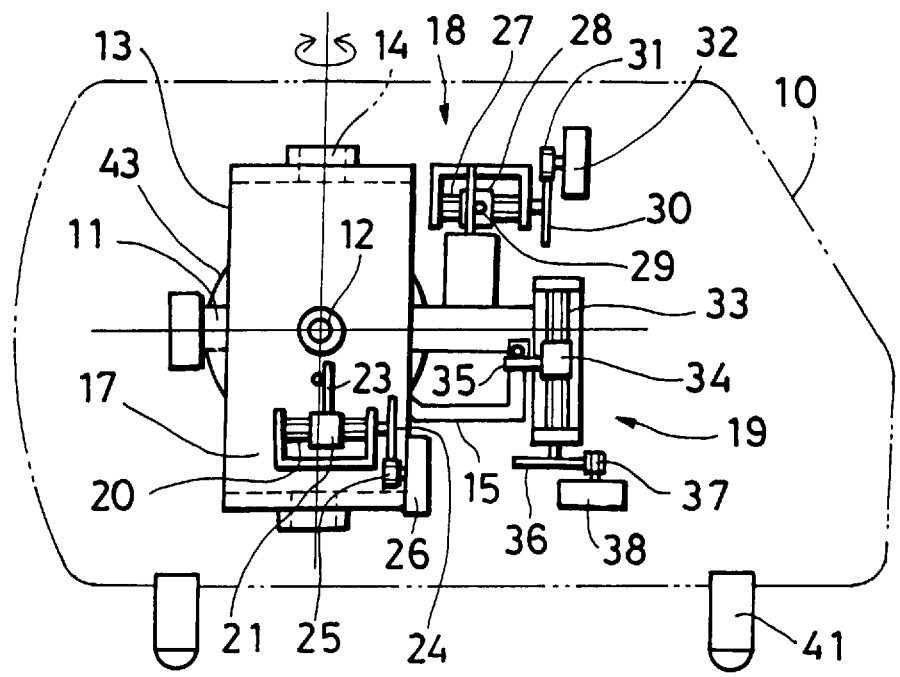
FIG. 1 is a side view of an essential portion of a laser sighting device according to an embodiment of the present invention.
Figure 2:
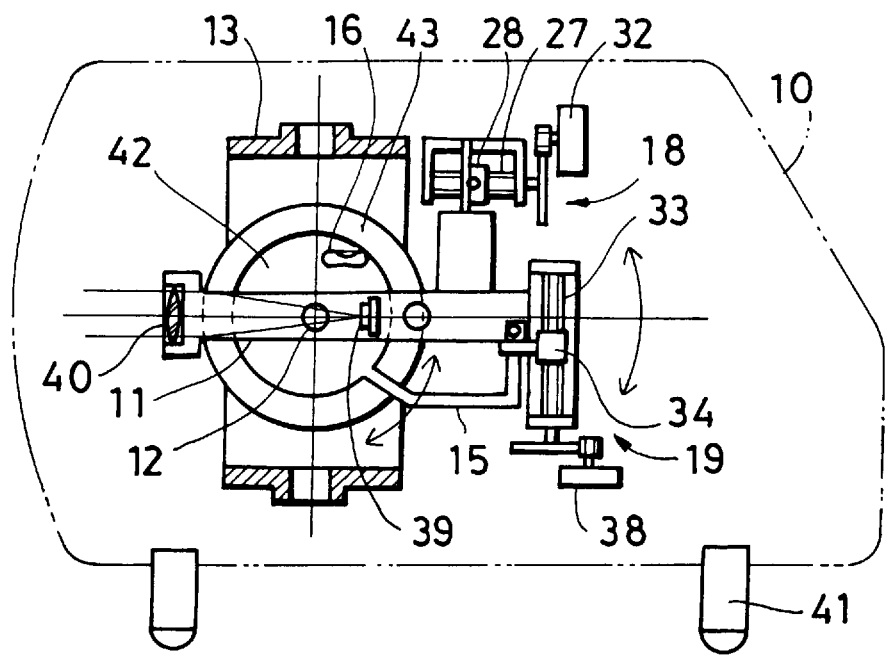
FIG. 2 represents a cross-sectional view of an essential portion of the laser sighting device of the above embodiment.
Figure 3A:
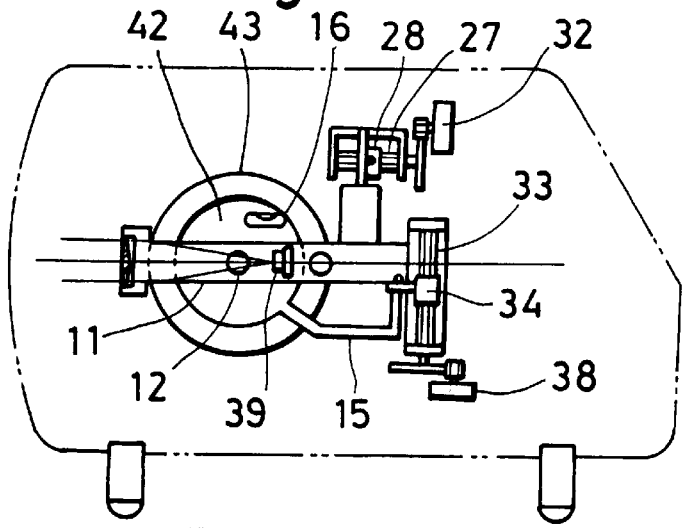
FIGS. 3 (A), (B) and (C) are drawings for explaining operation of the device.
Figure 3B:
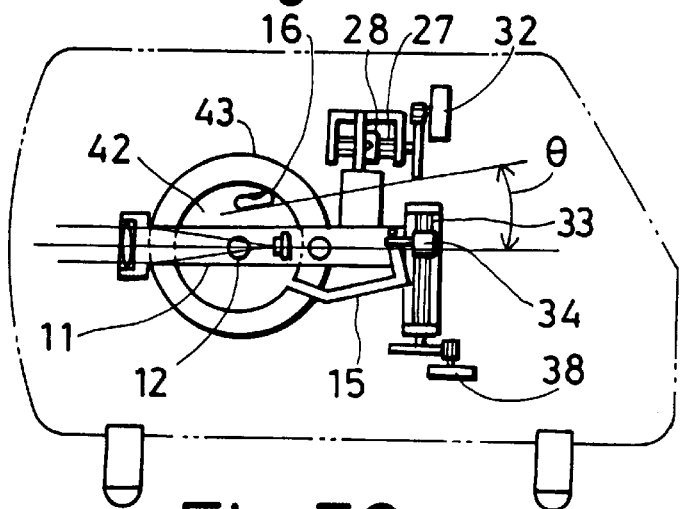
Figure 3C:
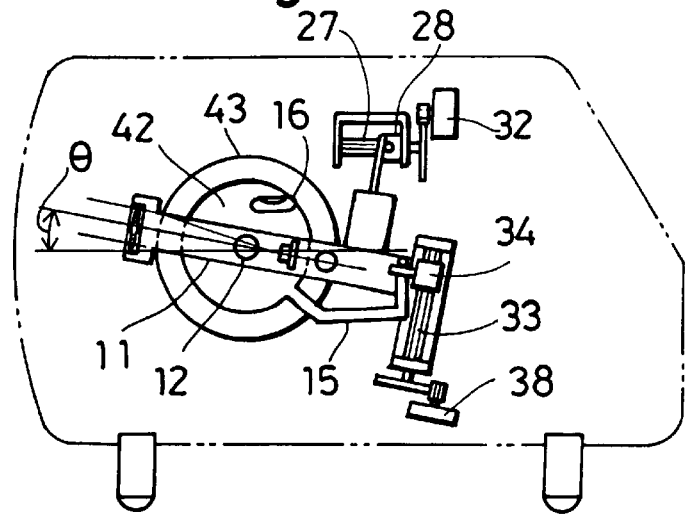
Figure 5:
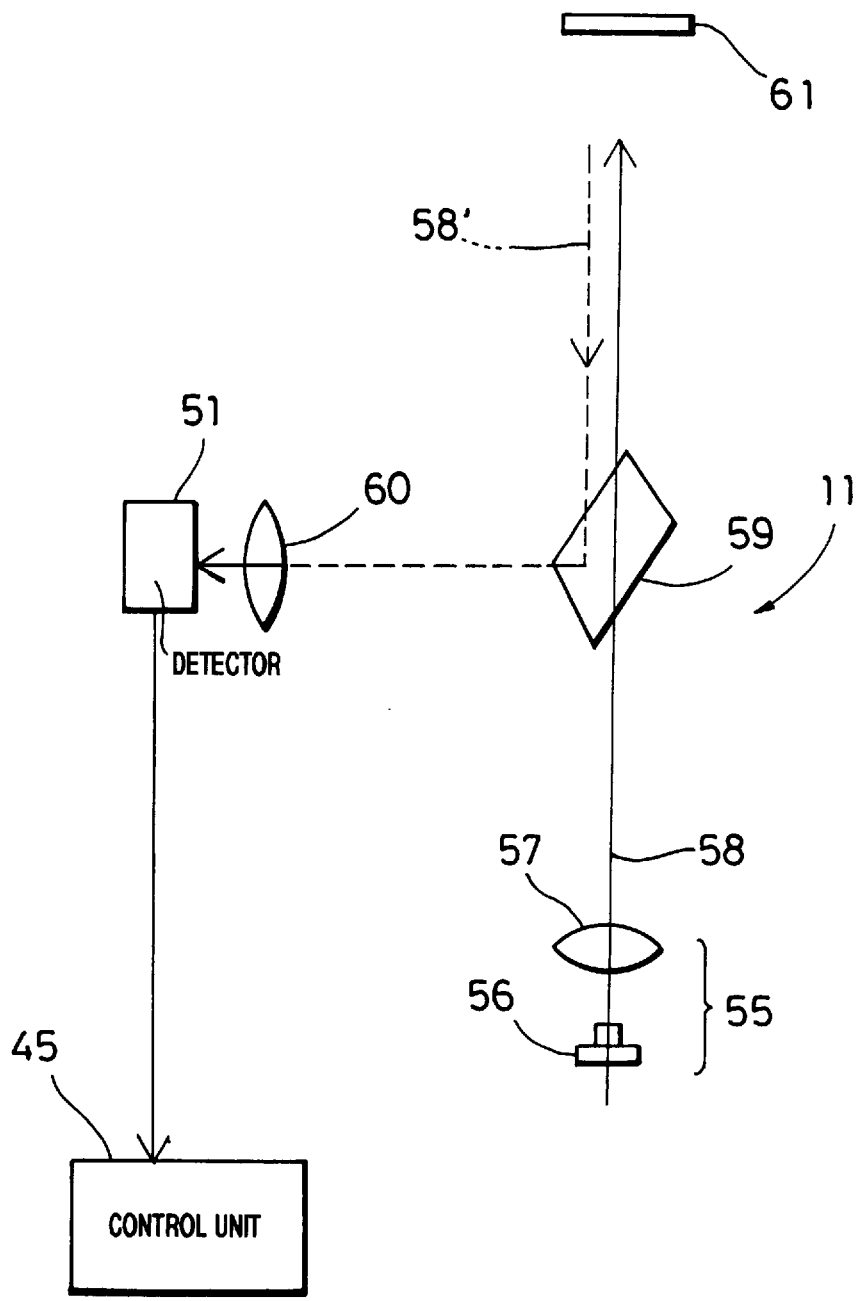
FIG. 5 is a block diagram showing an optical system of a laser oscillating device of the above embodiment.

It is needless to say that the targets shown in FIGS. 16 to 19 can be used as the embodiment shown in FIG. 5 if the ¼ λ birefringence member is not provided on the reflection surface. Further, the reflection surface may have only one of either the erect triangle or the inverted triangle. In this case, the width in the case where the scanning laser beam passing through the point of intersection of the cross 63 traverses the reflection surface may be measured in advance and set at the control unit 45 as a comparative value. Or, the reflection surface may be designed in a form having the maximal value or the minimal value, and such extreme values may be detected by the control unit 45.

Figure 14:
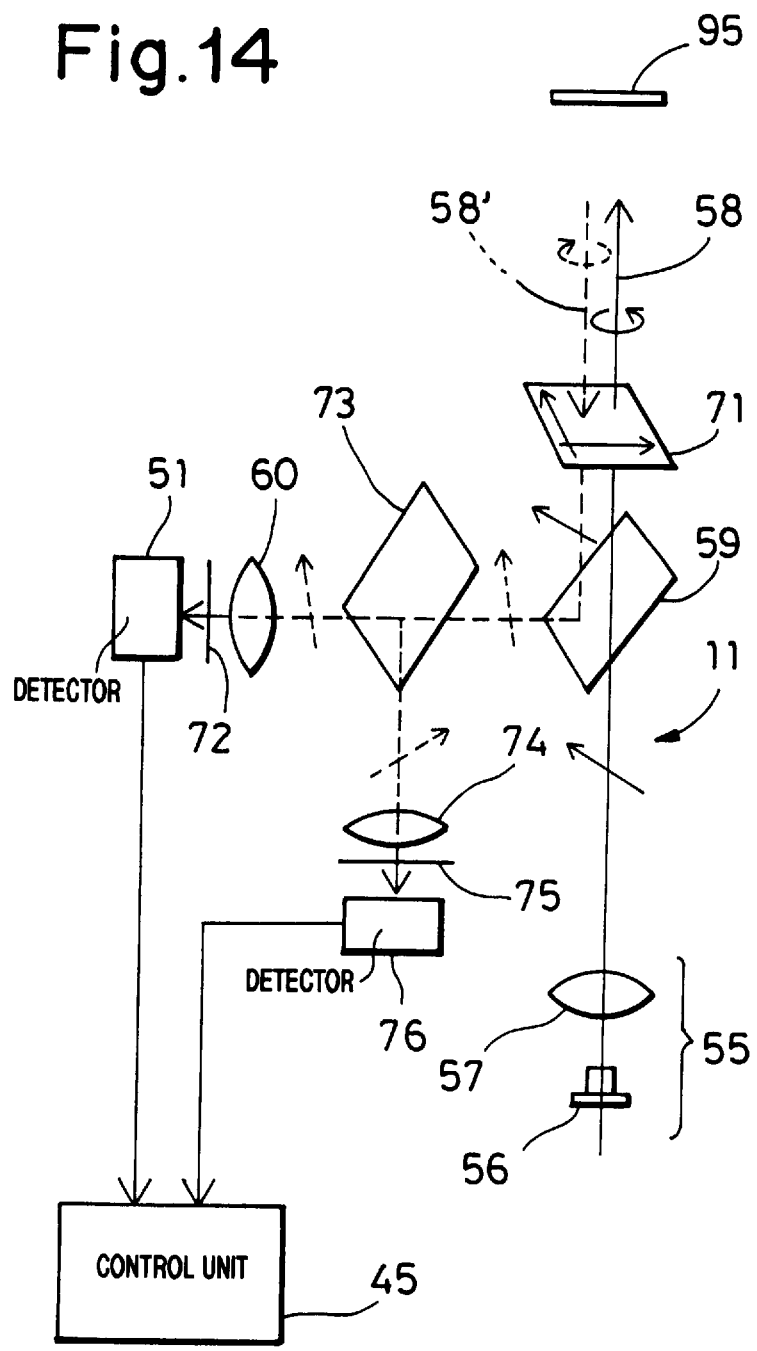
FIG. 14 is a block diagram showing still another example of the optical system of the laser oscillating device to be provided in the laser reference level setting device of the present invention.

FIG. 14 shows another embodiment of the invention, which has the following arrangement in addition to the embodiment shown in FIG. 13.

A half-mirror 73 is arranged between a first half-mirror 59 and a focusing lens 60. A circularly polarized laser beam 58' reflected by the second half-mirror 73 is allowed to enter a second reflection laser beam detector 76 via a focusing lens 74 and a polarizing plate 75, and a light receiving signal from the second reflection laser beam detector 76 is inputted to the control unit 45. The polarizing plate 72 has a direction of polarization deviated by 90° from that of the polarizing plate 75, and it is arranged in such manner that the first reflection laser beam detector 51 and the second reflection laser beam detector 76 can detect linearly polarized laser beams each having a direction of polarization deviated by 90°. The control unit 45 compares and calculates a laser beam receiving signal from the first reflection laser beam detector 51 with a laser beam receiving signal from the second reflection laser beam detector 76. In case the half-mirror 73 is a polarizing mirror, the polarizing plates 72 and 76 may not be used, and the first half-mirror 59 may be a perforated mirror.

Figure 20:
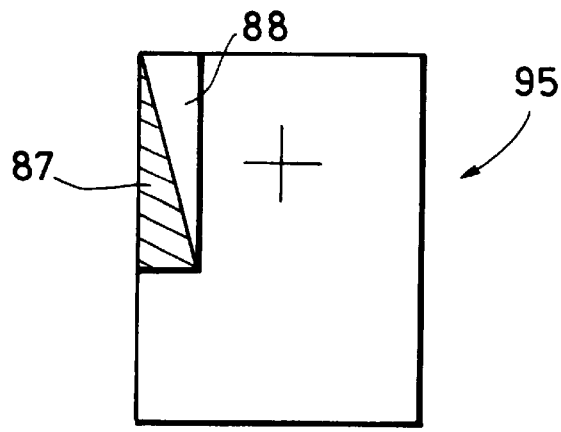
FIG. 20 shows still another example of the target.

A target 95 used in an embodiment of the present invention is designed, as shown in FIG. 20, to have a reflection surface in long rectangular shape. The reflection surface is divided into two portions by a diagonal line. One of the divided portions consists of a polarization converted reflection surface 87, and the other consists of a polarization maintaining reflection surface 88. The polarization converted reflection surface 87 in the form of an erect triangle has a ¼ λ birefringence member on its surface. It converts the direction of polarization of the incident laser beam and reflects it, and the polarization maintaining reflection surface 88 in the form of an inverted triangle maintains the direction of polarization of the incident laser beam and reflects it.

When a circularly polarized laser beam 58 is irradiated toward the target 95 for horizontal scanning, a circularly polarized laser beam 58' reflected by the polarization converted reflection surface 87 has its direction of polarization converted and passes through the ¼ λ birefringence member 71. After passing through the second half-mirror 73, the direction of polarization of the laser beam agrees with the polarizing plate 72 and the laser beam is detected by the first reflection laser beam detector 51. When reflected by the second half-mirror 73, the circularly polarized laser beam 58' has a direction of polarization different from that of the polarizing plate 75. The circularly polarized laser beam 58' thus reflected is cut off by the polarizing plate 75 and does not enter the second reflection laser beam detector 76.

The circularly polarized laser beam 58' reflected by the polarization maintaining reflection surface 88 is a reflection beam, which is maintaining the direction of polarization. After passing through the ¼ λ birefringence member 71, the direction of polarization of the laser beam agrees with that of the polarizing plate 75, while it does not agree with the polarizing plate 72. Therefore, the laser beam does not enter the first reflection laser beam detector 51 but it enters only the second reflection laser beam detector 76. The control unit 45 compares the light receiving signal from the first reflection laser beam detector 51 with that of the second reflection laser beam detector 76, and a position where pulse widths of the signals from the two reflection laser beam detectors 51 and 76 are equalized with each other is considered as the position where the circularly polarized laser beam 58 passes through the center of the cross 63. Because the distance from the center of the entire reflection surface of the target 95 to the point of intersection of the cross 63 is already known, the irradiated center of the target 95 can be obtained by calculation.

Figure 21:
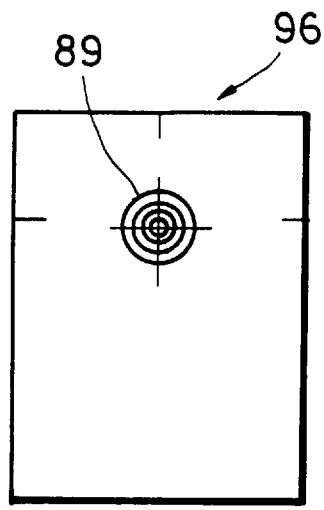
FIG. 21 shows a further example of the target.
Figure 22:
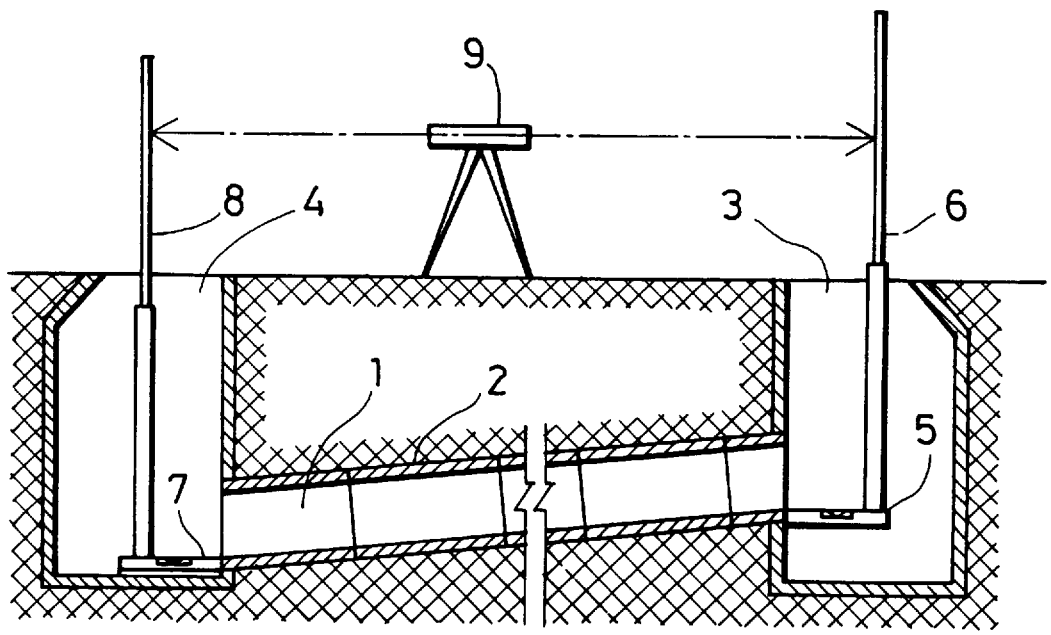
FIG. 22 is a drawing for explaining a conventional method for measuring a tilt angle of a tunnel.

In the target 96 shown in FIG. 21, transparent and semi-transparent light transmitting materials are used as the target plate 62, and an indicator 89 having its center agreeing with the point of intersection of the cross 63 is printed or marked on its rear side so that the irradiating position of the circularly polarized laser beam 58 can be confirmed from the reflection surface side.

INDUSTRIAL APPLICABILITY

As described above, the laser reference level setting device according to the present invention is used for forming a reference line in civil engineering work to lay concrete pipes, etc. under the ground or other construction work and is effective for improving the working efficiency in setting the reference line or for preventing erroneous operation during the setting of the reference line.

What we claim are:

1. A laser reference level setting device, comprising a laser sighting device and a target, wherein said target has a plurality of reflection surfaces for indicating a given position on the target, and said laser sighting device comprises a laser oscillating device having an emitting means rotatably supported for emitting a laser beam and a light receiving means for receiving a reflection laser beam, a driving unit for rotating at least the laser beam emitting means of the laser oscillating device, a control unit for controlling the driving unit to direct the laser beam to a given position on the target according to the light receiving condition of the reflected laser beam reflected from the reflection surface of the target, and a liquid crystal shutter arranged on at least one of said reflection surfaces of said target.

2. A laser reference level setting device according to claim 1, wherein said light receiving means of said laser sighting device comprises an electric filter synchronous with the opening/closing frequency of said liquid crystal shutter.

3. A laser reference level setting device according to claim 1, wherein said target has reflection surfaces arranged at symmetrical positions in vertical and horizontal directions.

4. A laser reference level setting device according to claim 1, wherein the light receiving means has a means for splitting the reflection light and has a filter synchronous with the opening/closing frequency of the liquid crystal shutter, the light receiving condition of the reflection light thus split and received is detected through the filter, and the center of the target is detected by comparing light quantity.

5. A laser reference level setting device according to claim 1, wherein there are a plurality of said liquid crystal shutters, and each of said liquid crystal shutters has a different opening/closing frequency.

6. A laser reference level setting device according to one of claims 1 or 3, wherein a ¼ λ birefringence member is provided at least on one of the reflection surface of said target, and the light receiving means has a polarizing means.

* * * * *